US008953220B2

(12) United States Patent
Tomi

(10) Patent No.: US 8,953,220 B2
(45) Date of Patent: Feb. 10, 2015

(54) IMAGE PROCESSING FOR ROTATION OF COMPRESSED IMAGE DATA

(75) Inventor: Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 13/023,215

(22) Filed: Feb. 8, 2011

(65) Prior Publication Data

US 2011/0222082 A1   Sep. 15, 2011

(30) Foreign Application Priority Data

Mar. 15, 2010 (JP) ................................. 2010-058299

(51) Int. Cl.
| | |
|---|---|
| H04N 1/64 | (2006.01) |
| H04N 1/54 | (2006.01) |
| H04N 1/46 | (2006.01) |
| H04N 1/00 | (2006.01) |
| G06F 3/12 | (2006.01) |
| G06K 15/02 | (2006.01) |
| G06K 9/46 | (2006.01) |
| H04N 1/387 | (2006.01) |

(52) U.S. Cl.
CPC ............... *H04N 1/3877* (2013.01); *H04N 1/64* (2013.01)
USPC .......... 358/1.9; 358/1.15; 358/1.16; 358/501; 358/505; 358/539; 358/401; 358/448; 382/166; 382/232; 382/233; 382/235

(58) Field of Classification Search
CPC ....................................................... G06T 3/602
See application file for complete search history.

(56) References Cited

U.S. PATENT DOCUMENTS

| | | | | |
|---|---|---|---|---|
| 5,065,446 A | * | 11/1991 | Suzuki et al. ................. | 382/253 |
| 5,297,217 A | * | 3/1994 | Hamilton et al. ............. | 382/296 |
| 5,625,759 A | * | 4/1997 | Freeman ...................... | 358/1.15 |
| 5,684,895 A | * | 11/1997 | Harrington ................... | 382/233 |
| 5,751,865 A | * | 5/1998 | Micco et al. ................. | 382/296 |
| 5,861,892 A | * | 1/1999 | Sato et al. .................... | 345/637 |
| 5,933,249 A | | 8/1999 | Shimura et al. | |
| 6,243,416 B1 | | 6/2001 | Matsushiro et al. | |
| 7,844,120 B2 | | 11/2010 | Yamamoto | |
| 2002/0178950 A1 | * | 12/2002 | Delhoune et al. ............ | 101/481 |
| 2007/0269118 A1 | * | 11/2007 | Sasaki et al. ................. | 382/232 |
| 2008/0037883 A1 | * | 2/2008 | Tsutsumi et al. ............ | 382/232 |
| 2009/0285479 A1 | * | 11/2009 | Hosaki ......................... | 382/166 |

FOREIGN PATENT DOCUMENTS

| | | |
|---|---|---|
| JP | 7-236062 | 9/1995 |
| JP | 10-257488 | 9/1998 |
| JP | 2002-271791 | 9/2002 |
| JP | 2004-104621 | 4/2004 |
| JP | 2007-143082 | 6/2007 |

\* cited by examiner

*Primary Examiner* — Beniyam Menberu
(74) *Attorney, Agent, or Firm* — Fitzpatrick, Cella, Harper & Scinto

(57) ABSTRACT

An image processing apparatus which can rotate input image data in a compressed state, comprises a storage unit which stores a rotation angle of the image data; a holding unit which holds, for each tile including blocks each including a predetermined number of pixels in the image data, information on a color arrangement in the block obtained by compressing the image data, color information corresponding to the color arrangement, and information on a position of the tile in the image data; and a rotation unit which converts the color arrangement in the block in accordance with the rotation angle of the image data stored in the storage unit to form rotated image data based on the converted color arrangement, color information corresponding to the color arrangement, and information on a position of the tile.

8 Claims, 21 Drawing Sheets

FIG. 3
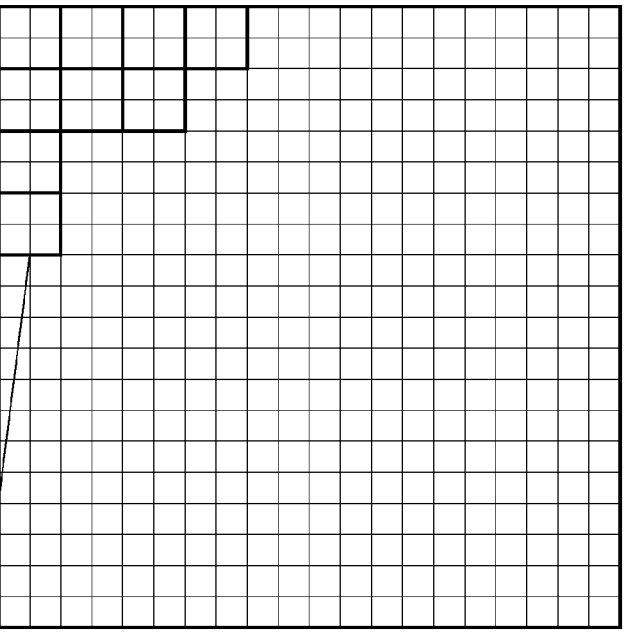
IMAGE
| | |
|---|---|
|  | ALL PIXELS HAVE THE SAME COLOR : ONE COMBINATION |
| 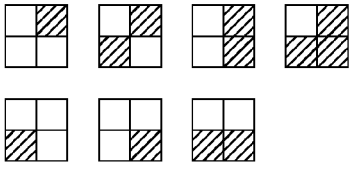 | EACH PIXEL HAS TWO COLORS : SEVEN COMBINATIONS |
|  | EACH PIXEL HAS THREE COLORS : SIX COMBINATIONS |
| 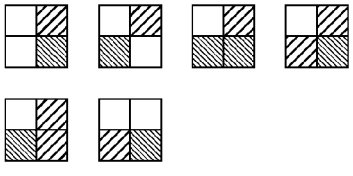 | ALL PIXELS HAVE DIFFERENT COLORS : ONE COMBINATION |

FIG. 4
| IMAGE | FLAG |
|:---:|:---:|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

FIG. 6

| | 1-2 | 1-3 | 1-4 | 2-3 | 2-4 | 3-4 |
|---|---|---|---|---|---|---|
| | bit 0 | bit 1 | bit 2 | bit 3 | bit 4 | bit 5 |

| IMAGE | COMPARISON RESULT | | | | | | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

FIG. 10

| COORDINATE POSITION (X, Y) | PACKET SIZE (Byte) | ADDRESS |
|---|---|---|
| (0, 0) | 32 | 0x10000000 |
| (1, 0) | 48 | 0x10000020 |
| (2, 0) | 36 | 0x10000050 |
| (3, 0) | 128 | 0x10000074 |
| ⋮ | ⋮ | |
| (X, Y) | 36 | 0x10010020 |

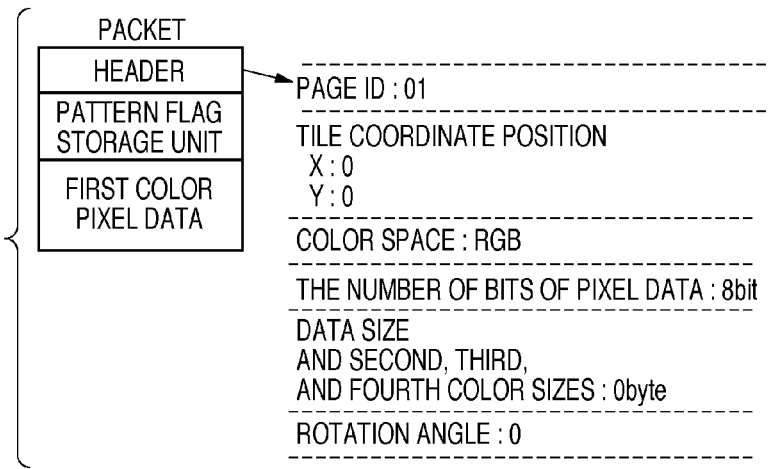
F I G. 14A
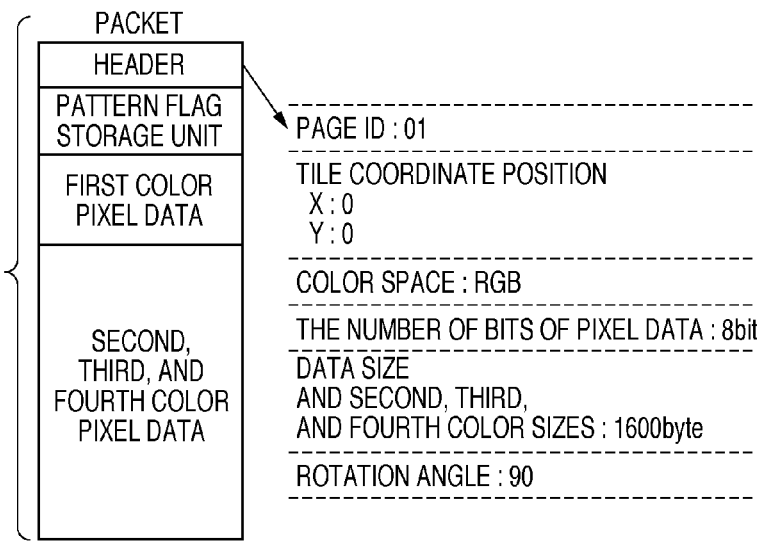
F I G. 14B
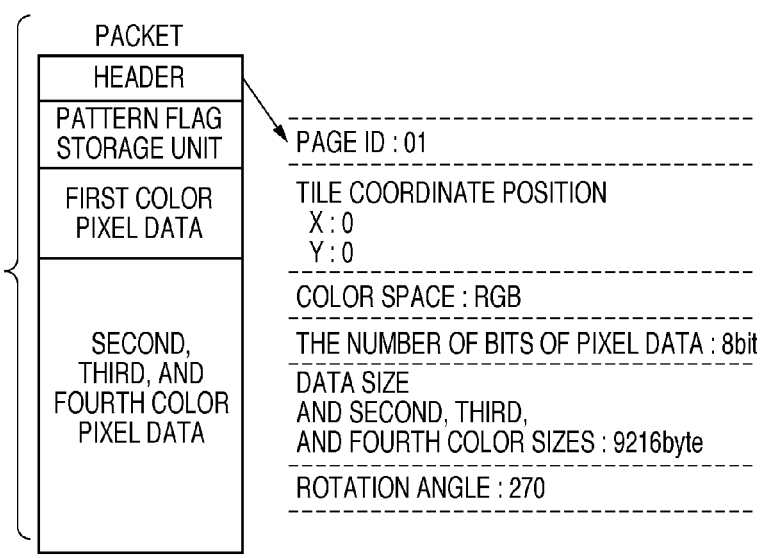
F I G. 14C

FIG. 15A

| COORDINATE POSITION (X, Y) | PACKET SIZE (Byte) | ADDRESS |
|---|---|---|
| (0, 0) | 896 | 0x10000000 |
| (1, 0) | 2248 | 0x10000380 |
| (0, 1) | 1496 | 0x10000c48 |
| (1, 1) | 1896 | 0x10001220 |
| (0, 2) | 2496 | 0x10001988 |
| (1, 2) | 1248 | 0x10002348 |

FIG. 15B

| COORDINATE POSITION (X, Y) | PACKET SIZE (Byte) | ADDRESS |
|---|---|---|
| (0, 0) | 2496 | 0x10001988 |
| (1, 0) | 1496 | 0x10000c48 |
| (2, 0) | 896 | 0x10000000 |
| (0, 1) | 1248 | 0x10002348 |
| (1, 1) | 1896 | 0x10001220 |
| (2, 1) | 2248 | 0x10000380 |

FIG. 15C

| COORDINATE POSITION (X, Y) | PACKET SIZE (Byte) | ADDRESS |
|---|---|---|
| (0, 0) | 2248 | 0x10000380 |
| (1, 0) | 1896 | 0x10001220 |
| (2, 0) | 1248 | 0x10002348 |
| (0, 1) | 896 | 0x10000000 |
| (1, 1) | 1496 | 0x10000c48 |
| (2, 1) | 2496 | 0x10001988 |

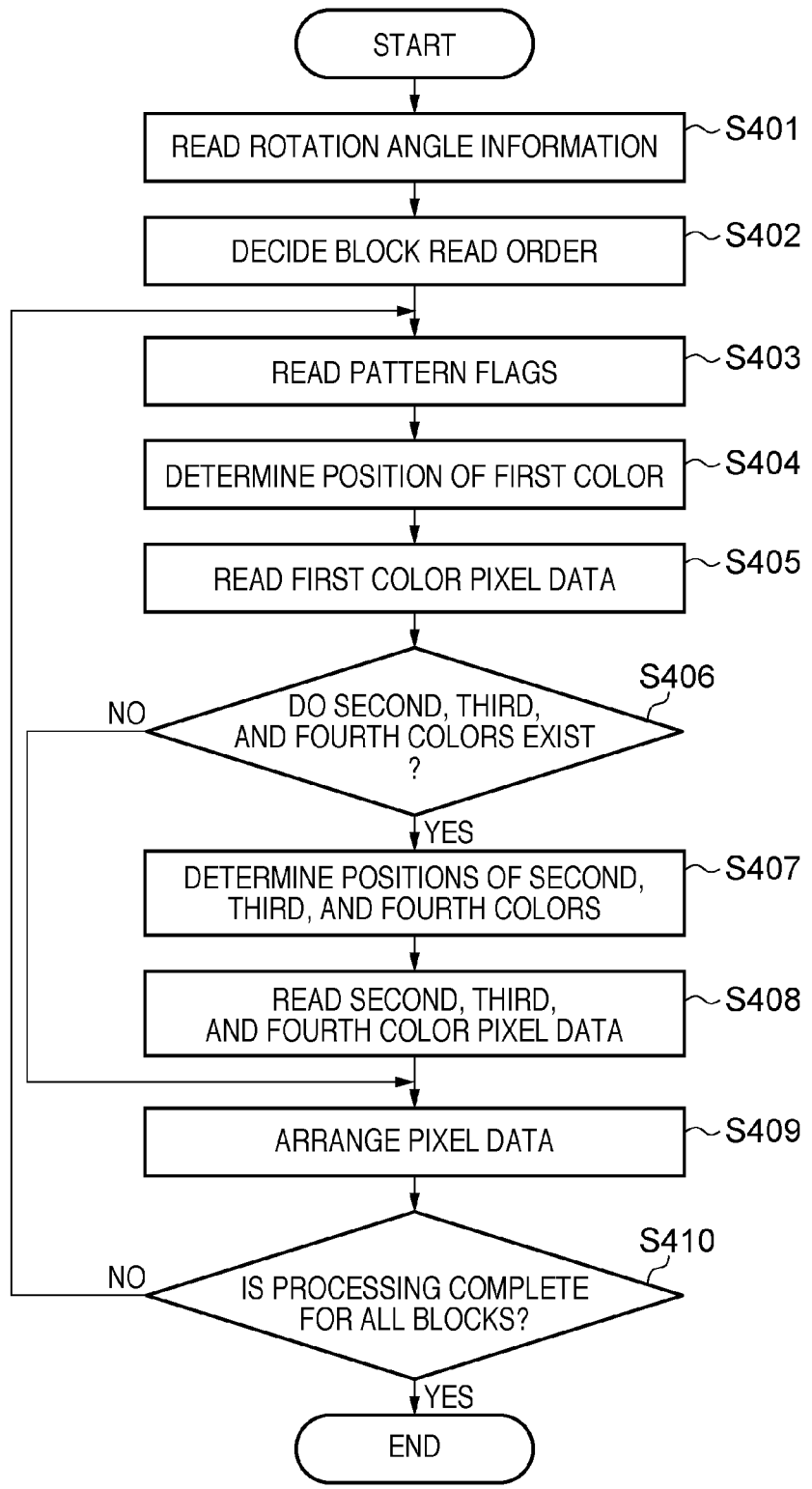

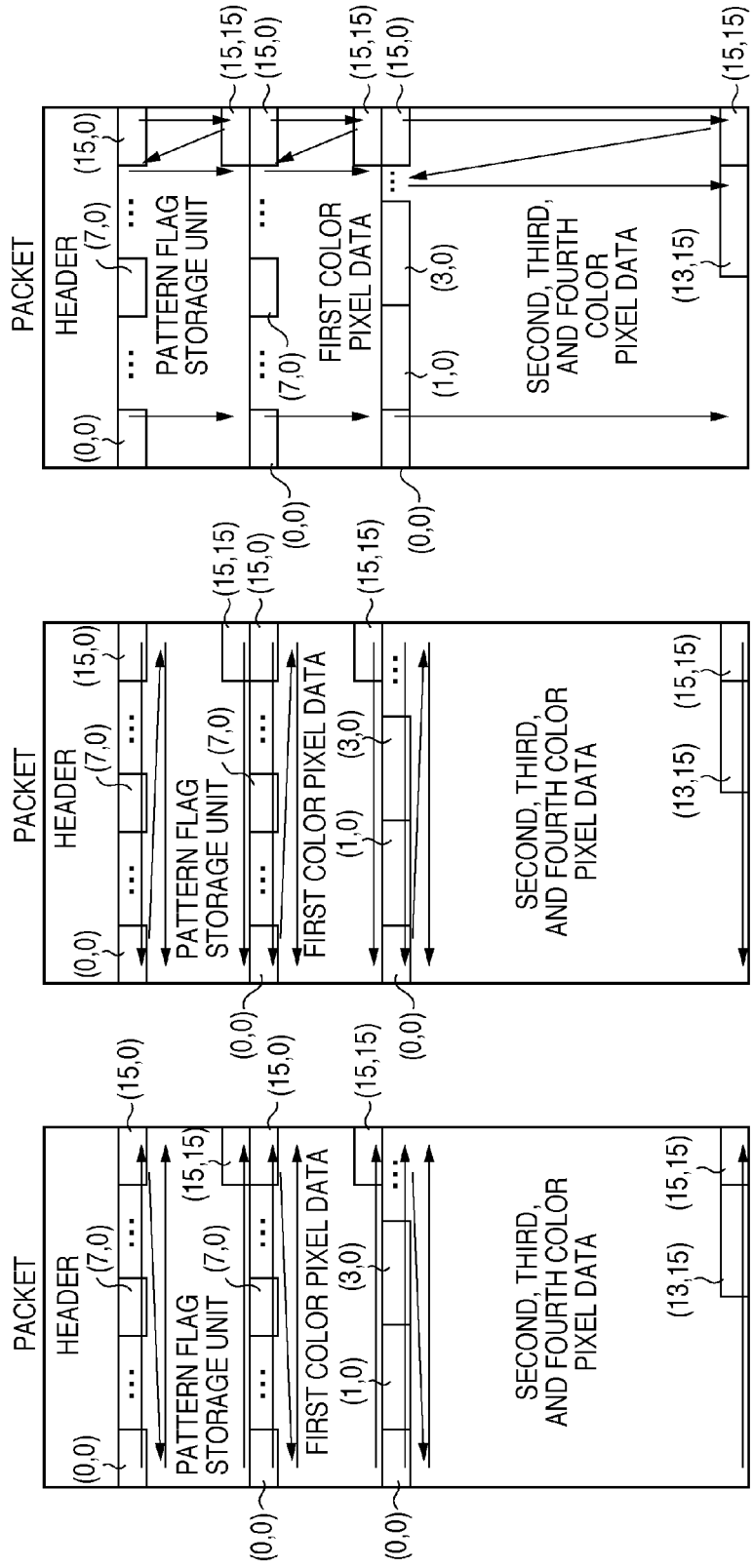

FIG. 21

ID data in its restoration.

IMAGE PROCESSING FOR ROTATION OF COMPRESSED IMAGE DATA

BACKGROUND OF THE INVENTION

1. Field of the Invention

The present invention relates to an image processing apparatus, control method, and computer-readable medium which perform image data compression processing in order to compress an image for each predetermined block, image processing for the data compressed for each predetermined block, and processing of restoring the processed data to the original image data. The present invention more particularly relates to processing of rotating the compressed data in its restoration.

2. Description of the Related Art

High-resolution color images have conventionally been in high demand. To meet the demands to improve image quality, it is becoming a common practice to process, by a digital multi-functional peripheral, images with resolutions of 1,200 dpi (dots per inch) or more. To save space on a memory/hard disk and to shorten the time taken to write data on it, not only a digital multi-functional peripheral but also image processing apparatuses (digital camera and facsimile apparatus) which process these images compress color image data to achieve cost reduction and speedup. As color still image compression schemes, a JPEG scheme which uses discrete cosine transformation and a scheme which uses wavelet transformation have conventionally widely been employed.

With an increase in resolution, the number of pixels which require image processing typified by rotation processing is dramatically increasing, so the processing load is getting heavier. For example, upon doubling the resolution from 600 dpi to 1,200 dpi, the number of pixels to be processed quadruples. When the above-mentioned image compression is employed, processing of decoding the compressed data becomes necessary to refer to and convert the pixel data with the doubled resolution. In other words, image processing typified by rotation processing cannot be performed for the compressed data intact, so its decoding processing inevitably becomes necessary. This makes it necessary to process all pixels in the high-resolution data for each pixel, thus prolonging the processing time.

Japanese Patent Laid-Open No. 2002-271791 discloses an image encoding apparatus which rotates an encoded image in its decoding. The image encoding apparatus described in Japanese Patent Laid-Open No. 2002-271791 divides an image into blocks of M×N pixels, performs its variable-length coding, and adds code information indicating the code length and the first address to be stored for each variable-length code in each image block. In rotating the image data through 90°, 180°, and 270° in its decoding, the block read order is changed.

However, in the image encoding apparatus described in Japanese Patent Laid-Open No. 2002-271791, because an image in each block is rotated in its decoding, storage in a buffer, and transfer to a band memory, not only a high-speed arithmetic unit or dedicated hardware but also a buffer memory becomes necessary, thus entailing a high cost. Furthermore, because the compressed data is decoded and then rotated, it takes much time to process a high-resolution image.

The present invention has been made in consideration of the above-mentioned problems, and provides an image processing apparatus which requires only a short period of time to process even a high-resolution image despite its low cost by easily performing rotation processing for compressed data.

SUMMARY OF THE INVENTION

According to one aspect of the present invention, there is provided an image processing apparatus which can rotate input image data in a compressed state, comprising: a storage unit which stores a rotation angle of the image data; a holding unit which holds, for each tile including blocks each including a predetermined number of pixels in the image data, information on a color arrangement in the block obtained by compressing the image data, color information corresponding to the color arrangement, and information on a position of the tile in the image data; and a rotation unit which converts the color arrangement in the block in accordance with the rotation angle of the image data stored in the storage unit to form rotated image data based on the converted color arrangement, color information corresponding to the color arrangement, and information on a position of the tile.

According to another aspect of the present invention, there is provided an image processing apparatus which can rotate input image data in a compressed state, comprising: a storage unit which stores a rotation angle of the image data; a holding unit which holds, for each tile including blocks each including a predetermined number of pixels in the image data, information on a color arrangement in the block obtained by compressing the image data, color information corresponding to the color arrangement, and information on a position of the tile in the image data; a rotation position holding unit which holds pieces of position information corresponding to color arrangements before rotation and after rotation, that correspond to the rotation angle of the image data; and a rotation unit which forms rotated image data using the color arrangement after rotation and color information corresponding to the color arrangement after rotation, in accordance with the position information held in the rotation position holding unit.

According to another aspect of the present invention, there is provided a control method for an image processing apparatus which can rotate input image data in a compressed state, comprising: a storage step of causing a storage unit of the image processing apparatus to store a rotation angle of the image data; a holding step of causing a holding unit of the image processing apparatus to hold, for each tile including blocks each including a predetermined number of pixels in the image data, information on a color arrangement in the block obtained by compressing the image data, color information corresponding to the color arrangement, and information on a position of the tile in the image data; and a rotation step of causing a rotation unit of the image processing apparatus to convert the color arrangement in the block in accordance with the rotation angle of the image data stored in the storage unit to form rotated image data based on the converted color arrangement, color information corresponding to the color arrangement, and information on a position of the tile.

According to another aspect of the present invention, there is provided a control method for an image processing apparatus which can rotate input image data in a compressed state, comprising: a storage step of causing a storage unit of the image processing apparatus to store a rotation angle of the image data; a holding step of causing a holding unit of the image processing apparatus to hold, for each tile including blocks each including a predetermined number of pixels in the image data, information on a color arrangement in the block obtained by compressing the image data, color information corresponding to the color arrangement, and information on a position of the tile in the image data; a rotation position holding step of causing a rotation position holding unit of the image processing apparatus to hold pieces of position information corresponding to color arrangements before rotation and after rotation, that correspond to the rotation angle of the image data; and a rotation step of causing a rotation unit of the image processing apparatus to form rotated image data using the color arrangement after rotation and color information corresponding to the color arrangement after rotation, in accordance with the position information held in the rotation position holding unit.

According to another aspect of the present invention, there is provided a computer-readable medium storing a program for causing a computer to function as: a storage unit which stores a rotation angle of image data; a holding unit which holds, for each tile including blocks each including a predetermined number of pixels in the image data, information on a color arrangement in the block obtained by compressing the image data, color information corresponding to the color arrangement, and information on a position of the tile in the image data; and a rotation unit which converts the color arrangement in the block in accordance with the rotation angle of the image data stored in the storage unit to form rotated image data based on the converted color arrangement, color information corresponding to the color arrangement, and information on a position of the tile.

According to another aspect of the present invention, there is provided a computer-readable medium storing a program for causing a computer to function as: a storage unit which stores a rotation angle of image data; a holding unit which holds, for each tile including blocks each including a predetermined number of pixels in the image data, information on a color arrangement in the block obtained by compressing the image data, color information corresponding to the color arrangement, and information on a position of the tile in the image data; a rotation position holding unit which holds pieces of position information corresponding to color arrangements before rotation and after rotation, that correspond to the rotation angle of the image data; and a rotation unit which forms rotated image data using the color arrangement after rotation and color information corresponding to the color arrangement after rotation, in accordance with the position information held in the rotation position holding unit.

According to the present invention, it is possible to achieve rotation image processing which requires only a short period of time to process even a high-resolution image despite a low cost.

Further features of the present invention will become apparent from the following description of exemplary embodiments with reference to the attached drawings.

BRIEF DESCRIPTION OF THE DRAWINGS

FIG. 3 is a view showing the patterns of blocks obtained upon dividing an image according to the embodiment;

FIG. 4 is a view showing the patterns of blocks and their identifiers according to the embodiment;

FIG. 6 is a view showing conversion of the patterns of blocks into flags according to the embodiment;

FIG. 10 is a table illustrating an example of a packet management table according to the embodiment;

FIGS. 14A, 14B, and 14C are views showing the packet configurations and the header configurations according to the embodiment;

FIGS. 15A, 15B, and 15C are tables illustrating examples of the packet management table according to the embodiment;

FIG. 17 is a flowchart showing the detailed sequence of the operation of the image rasterization/rotation unit according to the first embodiment;

FIGS. 19A, 19B, and 19C are views showing the data read orders in packets according to the embodiment;

FIG. 21 is a table showing the relationship between pattern flags and the positions of a first color in rotation according to the second embodiment.

DESCRIPTION OF THE EMBODIMENTS

First Embodiment

Figure 1:
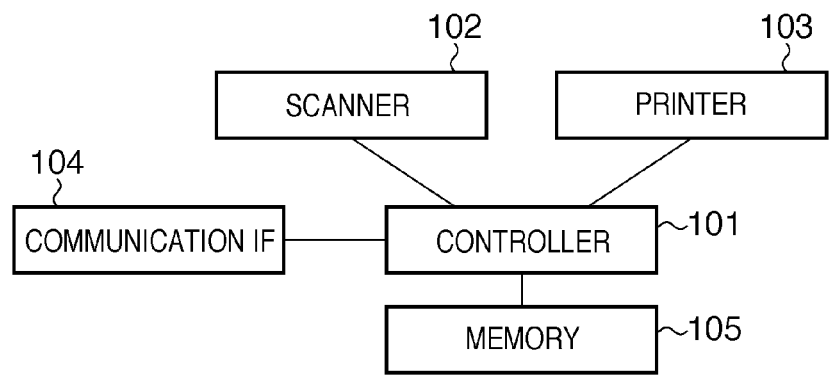
FIG. 1 is an overall block diagram of an image processing apparatus according to an embodiment of the present invention.

Best modes for carrying out the present invention will be described below with reference to the accompanying drawings. FIG. 1 is an overall block diagram of an image processing apparatus according to an embodiment of the present invention. An MFP (Multi-Functional Printer) which scans, prints, and copies is assumed as the image processing apparatus according to the embodiment of the present invention. The image processing apparatus includes a controller 101, scanner 102, printer 103, communication IF 104, and memory 105. The controller 101 is a part which plays a role in controlling the overall image processing apparatus. The controller 101 is electrically connected to each block including the scanner 102 and printer 103, and performs control to implement sophisticated functions. The controller 101 will be described in more detail later.

The scanner 102 is a block which optically reads a document image and converts it into an electrical image signal, and includes, for example, a contact image sensor (not shown), reading driving unit (not shown), and reading ON control unit (not shown). In scanning the entire document by the contact image sensor transported by the reading driving unit, an LED inside the contact image sensor undergoes ON control by the reading ON control unit. At the same time, a photosensor inside the contact image sensor optically reads the document image and converts it into electrical image data. The printer 103 is a block which prints a visible image of the electrical image signal on printing paper, and includes a laser beam printer or an inkjet printer. The communication IF 104 is a block which exchanges data with external devices, and connects to the Internet network or a LAN, connects to a public telephone line to perform facsimile communication, or connects to a PC (Personal Computer) via a USB interface. The memory 105 is a memory device such as a DDR-SDRAM or an HDD, and not only temporarily stores image data but also stores, for example, a control program and data used by the controller unit to implement the functions of the image processing apparatus.

Figure 2:
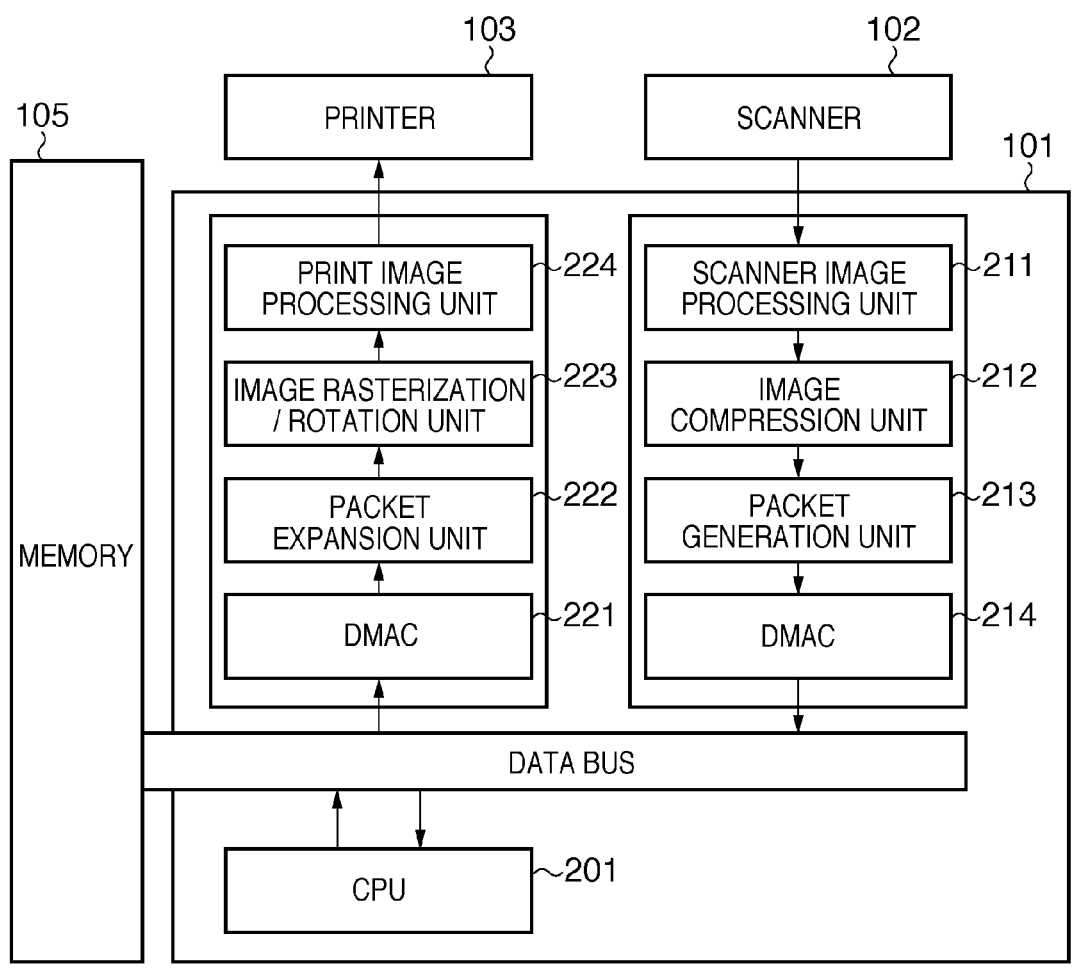
FIG. 2 is a block diagram of a controller shown in FIG. 1.

FIG. 2 is a block diagram of the controller 101. The controller 101 includes a CPU (Central Processing Unit) 201, a scanner image processing unit 211, an image compression unit 212, a packet generation unit 213, DMACs (Direct Memory Access Controllers) 214 and 221, a packet expansion unit 222, an image rasterization/rotation unit 223, and a print image processing unit 224. An overview of each unit will be described below. The CPU 201 controls the overall controller unit. The scanner image processing unit 211 performs, for example, shading correction of the image data read by the scanner 102, and its various types of image processing such as MTF correction, color conversion processing, filter processing, and gamma processing. After that, the scanner image processing unit 211 transfers the image data to the image compression unit 212.

The image compression unit 212 will be described in detail next. First, a block of 2×2 pixels is extracted from the image data for each page, received from the scanner image processing unit 211, and compresses the data for each block. Although the following description assumes a block of 2×2 pixels as a minimum unit, the present invention is not limited to this, and the block size may be changed as needed. At this time, the size and other specifications of the data to be described hereinafter are appropriately adjusted in accordance with the block size.

[Color Pattern]

Combinations of colors, that occur in accordance with the number of colors that is the number of types of colors which occupy data of 2×2=4 pixels, will be described before a description of processing. In this case, a block includes four pixels, so a maximum of four colors occupy the block, and only combinations of one to four colors exist in the block. Possible combinations (patterns) of these four colors will be described with reference to FIG. 3. First, when the block has only one color, the four pixels have the same color, so only one combination exists. A case in which the block has two colors will be considered next. When two colors are laid out in the four pixels assuming that the upper left pixel has a first color and the other color is a second color, the first or second color is assigned to the three pixels other than the upper left pixel, so a total of seven combinations are possible upon excluding a combination when the four pixels have the same color. A case in which the block has three colors will be considered. When three colors are laid out in the four pixels, one of the three colors is used twice, so the number of combinations when two out of the four pixels have the same color need only be obtained. In other words, in case of three colors, two coordinate positions are selected from the four coordinate positions, so a total of six combinations are possible. Lastly, when the block has four colors, only one pattern exists as in case of only one color. A total of 15 patterns are possible upon summing up the numbers of patterns in all cases of one to four colors. Considering that flags are associated with all of these patterns to identify them, 4-bit data is necessary. FIG. 4 depicts this data, and the flags associated with these patterns will be referred to as pattern flags hereinafter.

[Image Compression Processing]

Figure 5:
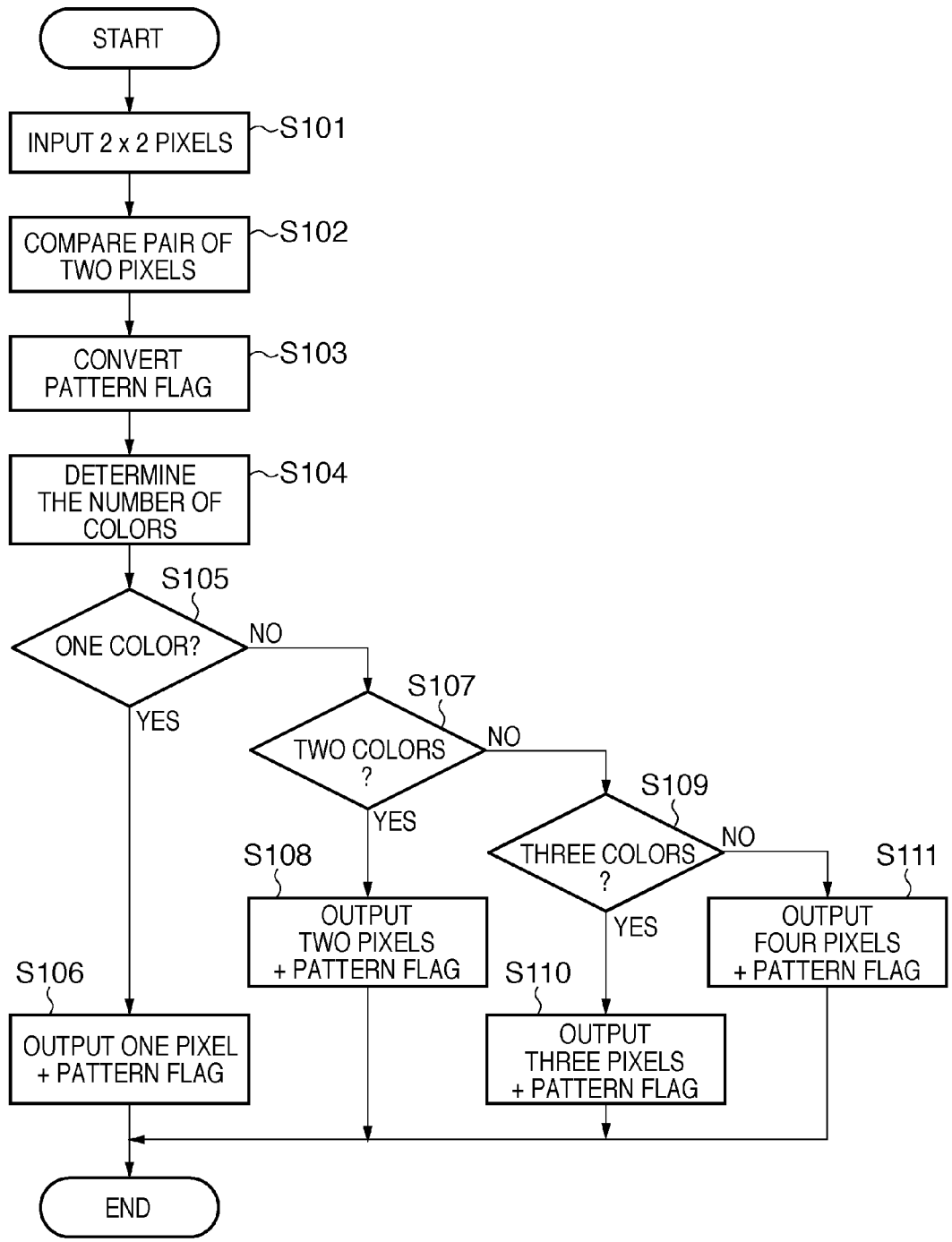
FIG. 5 is a flowchart showing the sequence of image compression according to the first embodiment.

The sequence of processing by the image compression unit 212 will be described with reference to FIG. 5 in consideration of possible combinations of 2×2 pixels as mentioned above. Note that in this embodiment, color information which has R, G, and B (Red, Green, and Blue) components each with 8 bits and 256 gray levels, for example, is used as an input, and a 24-bit image per pixel in a dot sequential system of 8-bit data is used as data. However, the present invention is not limited to this setting, and the number of bits may be changed as needed. In this case, the data size to be described hereinafter changes, as a matter of course.

First, a block divided in 2×2 pixels is input (S101). For all combinations of two pixels within the input block, sets of 24 bits of these pixels are compared (S102). If it is determined as a result of this comparison that all the bits coincide with each other (that is, that the two pixels have the same pixel value), 1 is output; otherwise, 0 is output. The process in step S102 will be described in more detail with reference to FIG. 6. Assuming that the upper left, upper right, lower left, and lower right pixels of a block including 2×2 pixels have coordinate positions 1, 2, 3, and 4, respectively, a total of six sets of two pixels 1-2, 1-3, 1-4, 2-3, 2-4, and 3-4 exist. Hence, six comparisons must be made, so 6 bits are output as a result. For example, if all of the four pixels have the same color, 1s are output as all comparison results; or if all of the four pixels have different pixel values, 0s are output as all comparison results. As described earlier, 15 patterns may occur upon color matching among the four pixels, so the 6-bit comparison results can be assigned with a 4-bit pattern flag and converted into it (S103).

After the conversion into a 4-bit pattern flag, the number of colors that has occurred in the four pixels and their color pixel data (color information) are extracted (S104). Thus, color acquisition and arrangement acquisition are performed. The positions of second and subsequent colors assuming that the upper left pixel in the block of 2×2 pixels has a first color can be obtained from the pattern flag. Note that in this embodiment, a block includes four pixels and therefore includes a maximum of four colors as well. As the number of pixels which form a block increases, the maximum number of colors included in the block changes.

Figure 7:
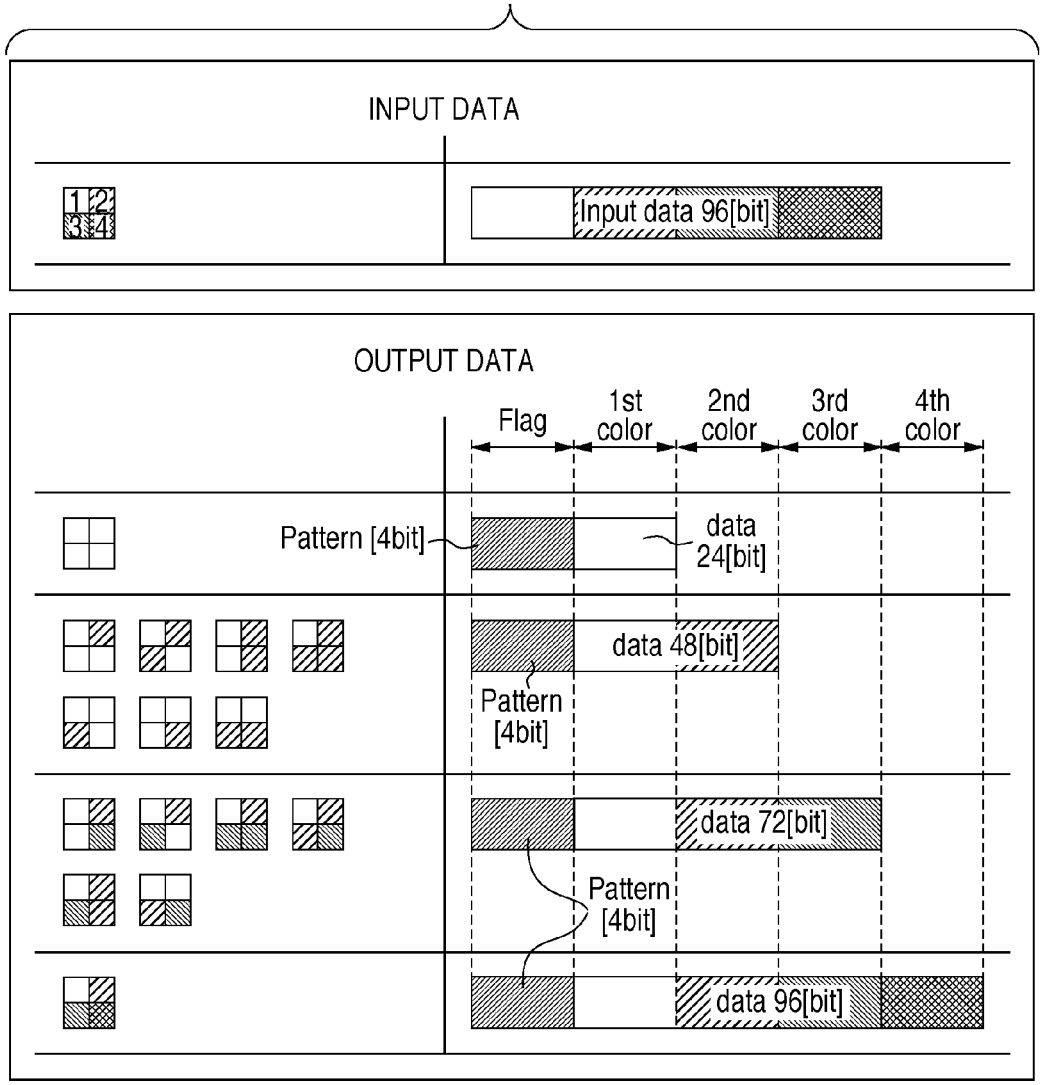
FIG. 7 is a view showing the relationship between the input and output upon compression processing according to the first embodiment.

The processes in subsequent steps of the image compression processing will be described herein with reference to FIG. 7. If it is confirmed in step S104 that the four pixels have only one color, it is determined in step S105 that only one color (none of the second and subsequent colors exist) exists. Note that in step S105, it is determined whether the number of extracted colors is equal to or larger than a predetermined number (it is determined whether the four pixels have only one color). Then, 4 bits of the pattern flag and 24 bits of the first color are output (S106). Similarly, if it is confirmed in step S104 that the four pixels have two colors, it is determined in step S107 that two colors exist. Then, the coordinate position of a pixel having the pixel value of the second color is calculated from the pattern flag, and 4 bits of the pattern flag and 48 bits of the pixel values of the two colors are output (S108). The same processing is performed when the four pixels have three or four colors as well (S109 and S110 or S111). At this time, color data that have not previously occurred are stored in ascending order of the coordinate positions of the pixels in the block (in the order of the upper left, upper right, lower left, and lower right pixels).

In this manner, the amount of output data can be reduced with relatively simple processing for input data of 96 bits for four colors within a block including 2×2 pixels by acquiring and outputting a O-bit pattern flag and pixel values, the number of which is equal to that of colors existing in this data. Also, the number of colors within the block can be specified by referring to the pattern flag. Moreover, the pixel value of each pixel included in the block can be specified based on the pattern flag and the order in which the colors are stored. Data compression of the entire image field can be performed by performing this processing for all image blocks.

[Header Information]

Figure 8:
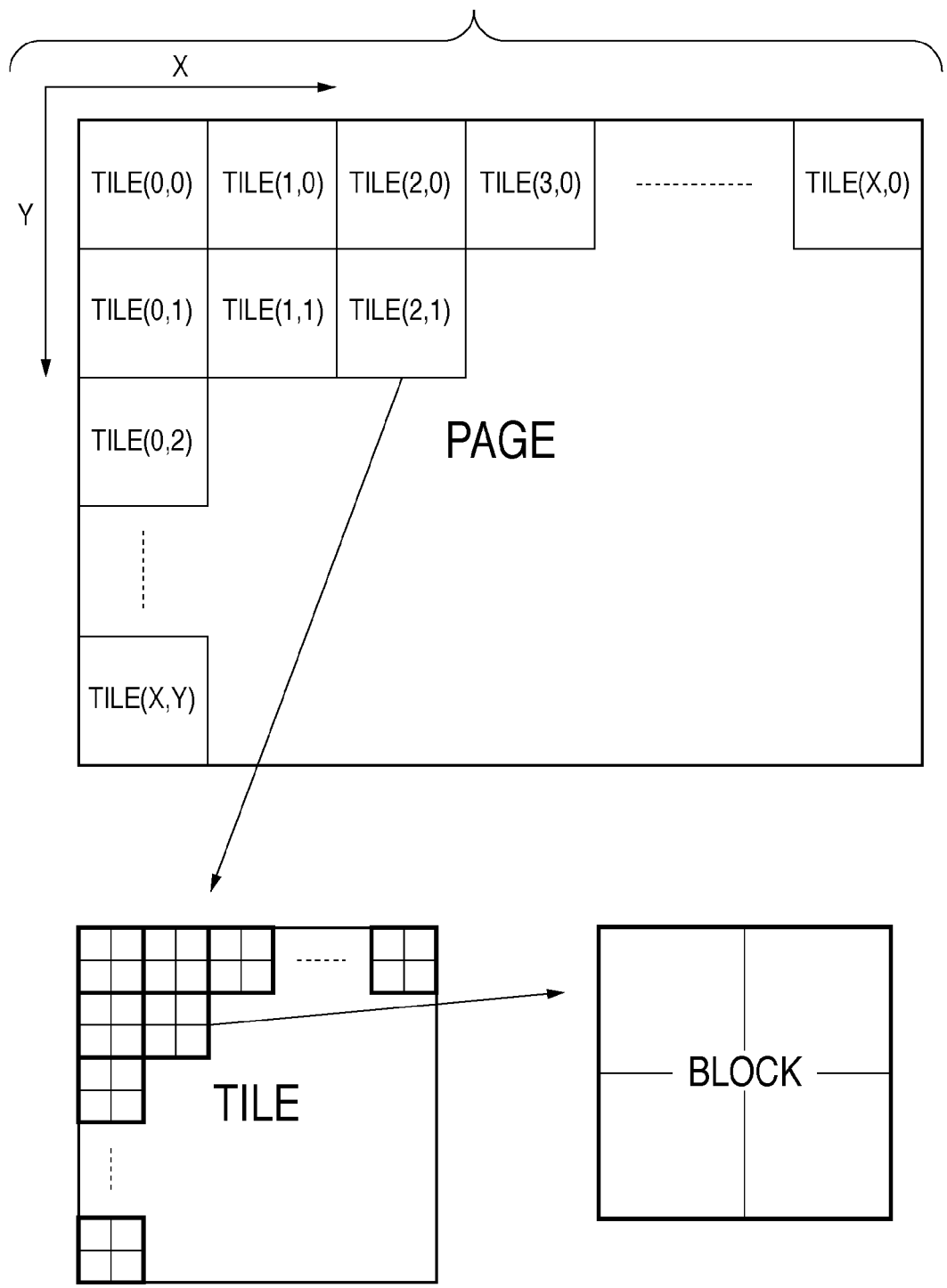
FIG. 8 is a view showing the relationship among a page, tiles, and blocks according to the first embodiment.

The packet generation unit 213 reads the image data, compressed by the image compression unit 212, for each predetermined size as a unit (this unit is a set of 32×32 pixels and will be referred to as a tile in this embodiment), and header information with a predetermined fixed length is assigned to each tile. FIG. 8 shows the relationship between tiles and blocks.

Figure 9:
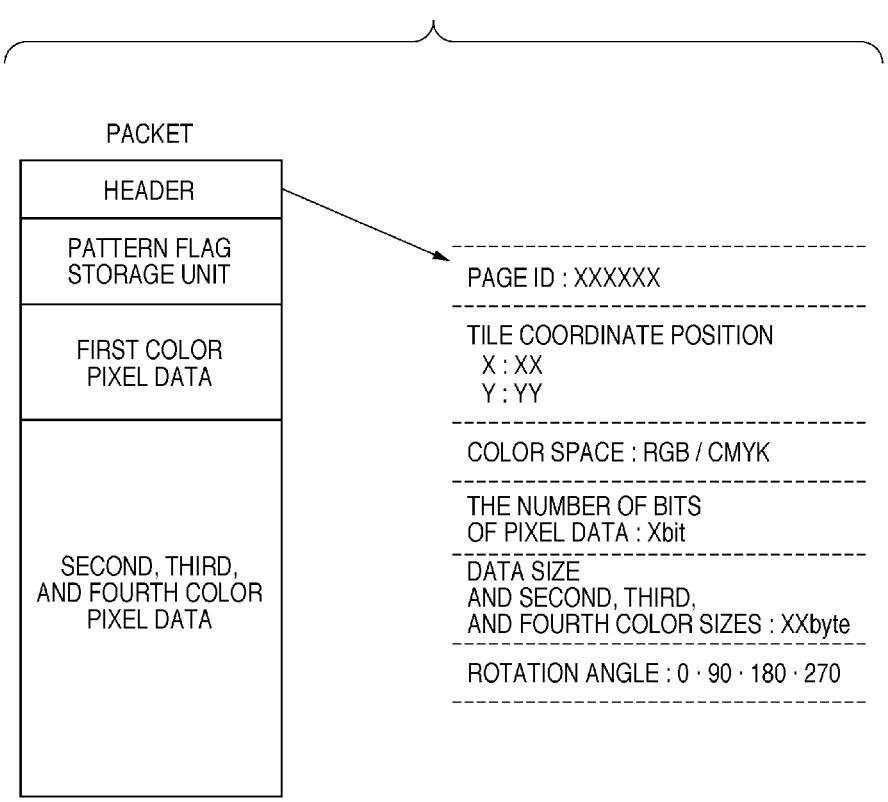
FIG. 9 is a view showing the packet configuration and the header configuration according to the embodiment.

The header describes pieces of information such as the page ID, the tile coordinate position, the color space, the number of bits of pixel data, the data size of a tile, and the rotation angle information. FIG. 9 illustrates an example of the configuration of the header information assigned to a tile. The page ID describes an ID number which is uniquely assigned to each page. The tile coordinate position describes the position of the tile on a raster image for each page. In this case, the tile coordinate position is represented by a two-dimensional coordinate position defined by X- and Y-coordinates. The color space describes an identifier used to determine whether the tile is an RGB image, a CMYK image, or a GRAY-SCALE image. The number of bits of pixel data describes the bit length per pixel within the tile. The data size describes the sizes of pixel data of the second, third, and fourth colors of the tile in units of bytes. The rotation angle information includes information on the rotation angle of the image, and is one of angles of 0°, 90°, 180°, and 270° in the clockwise direction. Note that the header information is not limited to this configuration. Also, the rotation angle information may be held for each target to be rotated (for example, each page or each tile).

The unit of data including the tile information and header information will be referred to as a packet hereinafter. A method of forming a packet data structure will be described. The data generated by the image compression unit 212 can be roughly classified into three data types: a pattern flag, first color pixel data, and second, third, and fourth color pixel data. In an image which has 8 bits for each of R, G, and B colors and includes 32×32 pixels as a tile unit, the size of each data is defined by:

Pattern Flag (4 Bits in Each Block): 4×16×16/8=128 Bytes

First Color Data Size (24 Bits in Each Block): 24×16×16/8=768 Bytes

Second, Third, and Fourth Color Data Size (Maximum of 72 Bits in Each Block): Maximum of 72×16×16/8=Maximum of 2304 Bytes (this size differs for each image)

A storage unit (not shown) which can store these data sizes is provided in the packet generation unit 213, and collectively stores data of the same data type in the same area. A packet data structure as shown in FIG. 9 can be formed by adding the header after compression processing is completed for each tile and the data sizes are confirmed.

Pixel data subsequent to the first color pixel data are stored in memory areas without quantizing or encoding these pixel data for each pixel. In other words, color processing which is completed by one pixel input/output, such as color conversion which uses an LUT, gamma correction processing, and color space conversion processing which uses a matrix operation can be directly performed without a particular need to refer to the pattern flag. Directly using compressed data in this way, the transfer efficiency on a memory bus improves, and data with pixels fewer than the original image is processed, thus allowing high-speed processing.

Also, upon storing image data on the memory in the above-mentioned way (in a way as shown in FIG. 9), the image results obtained in the first color pixel data area by sampling images in the pixels at the upper left coordinate positions in the sets of 2×2 pixels continuously exist on the memory. The image processing apparatus described in this embodiment has functions of, for example, preview display of accumulated PDL (Page Description Language) image data and scanned image data, and the above-mentioned network transmission. For example, even if the print resolution is 600 dpi, the preview display and transmission normally do not require such a high resolution but require only a resolution of 300 dpi or less in many cases. When thumbnail data used in such cases must be obtained, a raster image with a half size can be easily obtained by processing only the first color image data without using the pattern flag and the second, third, and fourth colors.

Figure 11:
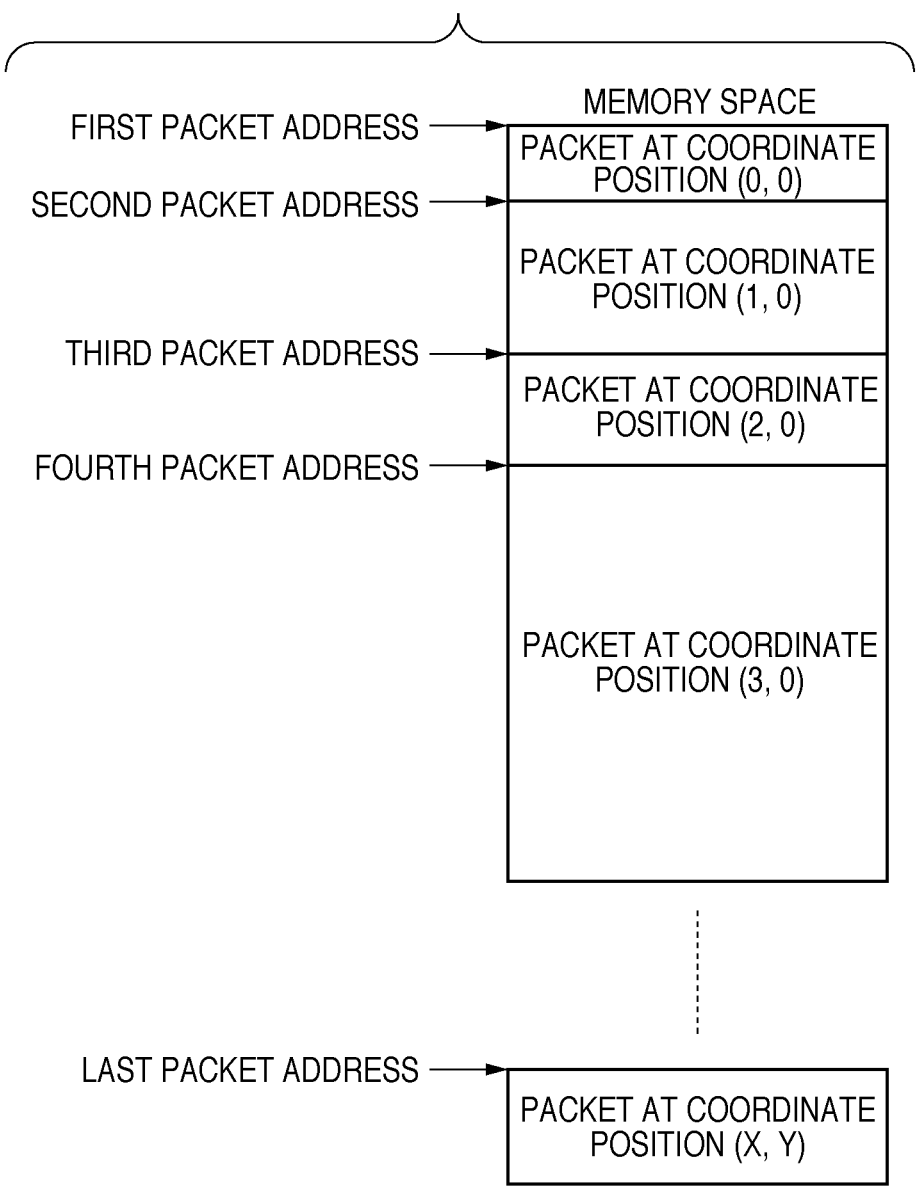
FIG. 11 is a view showing the layout of compressed data on a memory space according to the first embodiment.

An arbitrary packet can be accessed by listing the tile coordinate positions and sizes and the addresses at which packets are stored to generate a packet management table including these pieces of information. FIG. 10 illustrates an example of the packet management table. When an image is written on the memory as a packet for each tile in this way, the size differs for each packet, as shown in FIG. 11, so the first addresses of respective packet have discrete values. Hence, the packet management table is searched for the first address of a packet at an arbitrary coordinate position. In this manner, arbitrary data can be accessed for each tile, thus making it possible to partially process the image.

The packet generation unit 213 transfers the generated packet to the DMAC 214. The DMACs 214 and 221 have a DMA (Direct Memory Access) function of controlling transfer of the image data from the memory 105. The packet expansion unit 222 receives the packet from the DMAC 221. Also, the packet expansion unit 222 sends, to the image rasterization/rotation unit 223, the rotation angle information, acquired from the header of the packet, the pattern flag, the first color pixel data, and the second, third, and fourth color pixel data.

Figure 12:
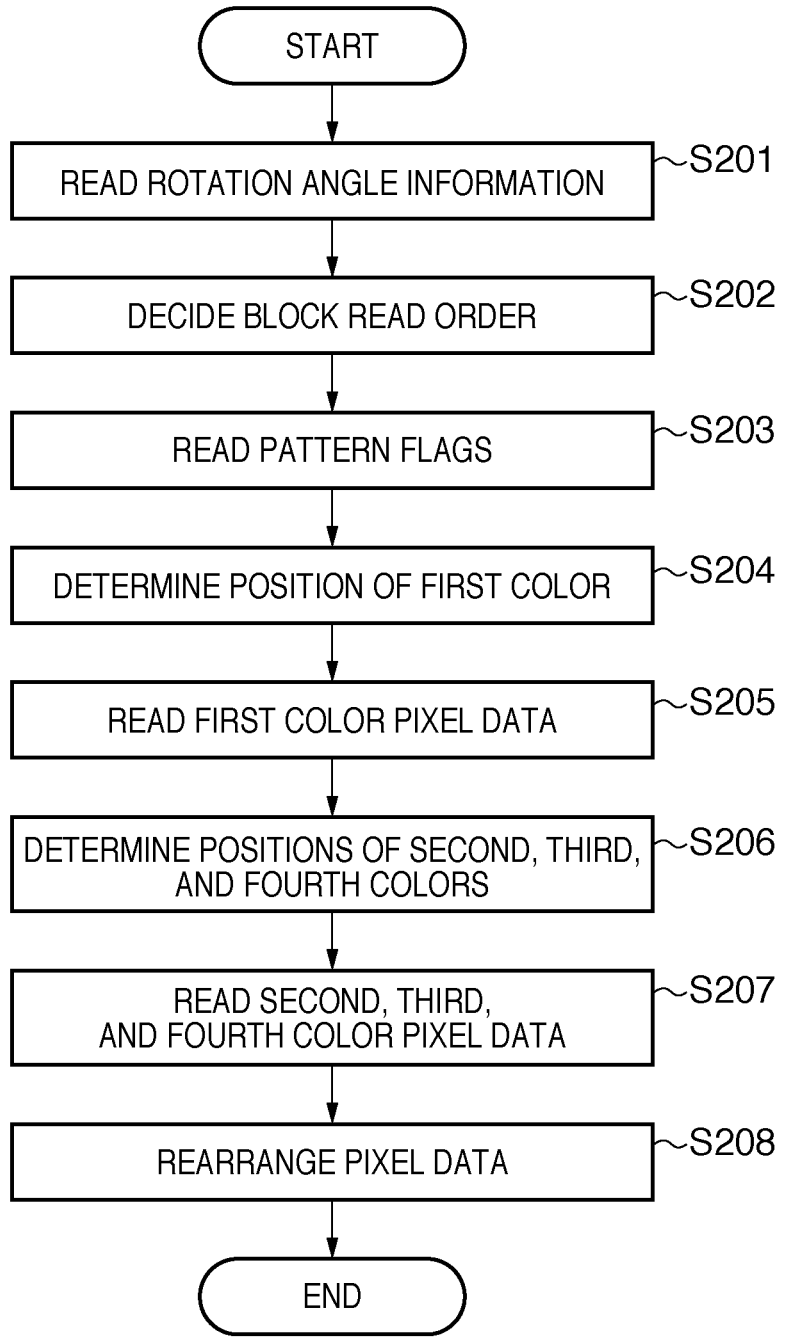
FIG. 12 is a flowchart showing the schematic sequence of the operation of an image rasterization/rotation unit according to the first embodiment.

The sequence of processing by the image rasterization/rotation unit 223 will be described herein. The image rasterization/rotation unit 223 performs processing of restoring the data, transferred from the packet expansion unit 222, to raster image data based on the pattern flag and pixel data as described earlier. FIG. 12 is a flowchart showing processing by the image rasterization/rotation unit 223. First, the image rasterization/rotation unit 223 reads the rotation angle information of the data transferred from the packet expansion unit 222 (S201). The block read order corresponding to the read rotation angle is decided (S202). The pattern flags are read in the same order as the block read order (S203). The position of the first color is determined from the rotation angle and the pattern flag (S204). The first color pixel data is read in accordance with the rotation angle information (S205). The positions of the second, third, and fourth colors are determined from the rotation angle and the pattern flag (S206). The second, third, and fourth color pixel data corresponding to the number of colors are read (S207). The pixel data are arranged in accordance with the color arrangement determined based on the pattern flag, and the position of the first color pixel (S208). In this way, the block including 2×2 pixels is rasterized and decoded. A more detailed processing method will be described later with reference to, for example, FIG. 17.

The print image processing unit 224 performs, for example, binarization processing, halftone processing, and color conversion processing such as RGB-to-CMYK conversion for the image data having undergone the scanner image processing to convert it into a halftone image. Also, the print image processing unit 224 converts the resolution in accordance with the printing resolution, performs various types of image processing such as image scaling, smoothing, and density correction for the resultant image to convert it into high-resolution image data, and outputs the resultant image to, for example, a laser beam printer.

[Sequence of Image Processing]

Figure 13:
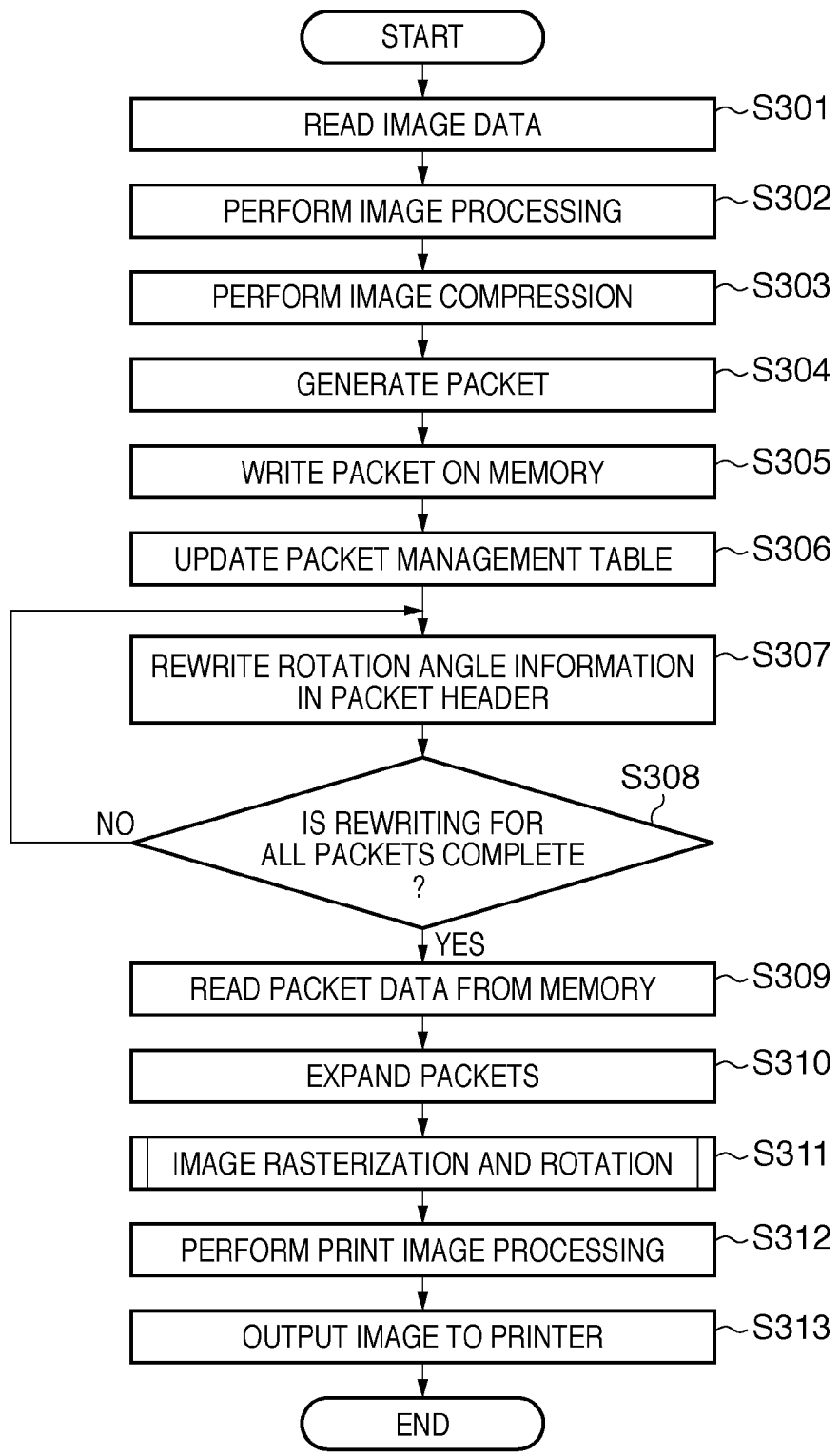
FIG. 13 is a flowchart showing the sequence of the operation of the controller according to the first embodiment.
Figure 16A:
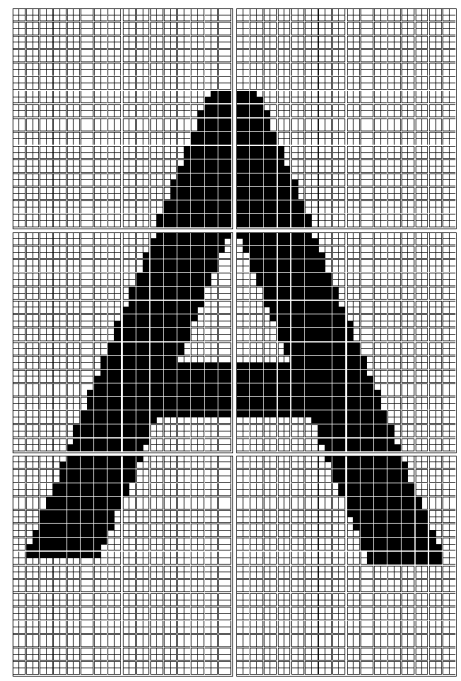
FIGS. 16A, 16B, and 16C are schematic views of the packet arrangements according to the embodiment.
Figure 16B:
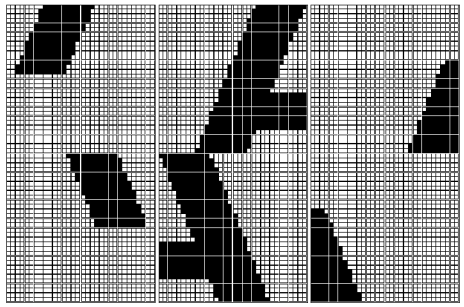

FIG. 13 is a flowchart showing the operation of the image processing apparatus according to the first embodiment. The procedure, in which image data is read from the scanner, is rotated through 90° clockwise, and is output to the printer, will be described in the first embodiment. Especially the operation of the image rasterization/rotation unit 223 will be described in detail. Assume herein that the image data has a size of 64×96 pixels and the tile in packet generation has a size of 32×32 pixels. The scanner 102 reads image data in three, R, G, and B colors (S301). The scanner image processing unit 211 of the controller 101 performs image processing such as shading processing and filter processing (S302). The image compression unit 212 performs image compression processing (S303). The packet generation unit 213 converts the compressed data into a packet to generate the packet (S304). The packet is stored and held in the memory 105 via the DMAC 214 (S305). FIG. 14A shows the data structure of a packet represented by a tile coordinate position (0, 0). After the packet is stored in the memory, the CPU 201 updates the packet management table (S306). FIG. 15A shows the packet management table before updating, and FIG. 16A shows a schematic view of the packet arrangement. Also, FIG. 15B shows the packet management table updated upon being rotated through 90° clockwise, and FIG. 16B shows a schematic view of the packet arrangement.

After the packet management table is updated in step S306, the CPU 201 rewrites the pieces of rotation angle information of the headers of all packets from 0° to 90° (S307). FIG. 14B shows the data structure of a packet represented by a tile coordinate position (0, 0) when the updating of the packet management table and the rewriting of the pieces of rotation angle information in the header are completed. It is determined whether the pieces of rotation angle information of all packets have been rewritten (S308). If YES is determined in step S308, the packet data stored and held in the memory 105 is read via the DMAC 221 in accordance with the packet management table (S309). More specifically, the addresses are designated and read in turn from a packet represented by (0, 0) in the updated packet management table. If NO is determined in step S308, the process returns to step S307, in which the process in step S307 is repeated until the rewriting of the rotation angle information is applied to all blocks. The packet expansion unit 222 expands the packets (S310). The image rasterization/rotation unit 223 rotates the data, transferred from the packet expansion unit 222, while rasterizing it into raster image data (S311). The raster image data is input to the print image processing unit 224, and undergoes area coverage modulation processing by the dither method or the error diffusion method (S312). Thus, image data is formed and output to the printer 103 (S313).

[Image Rasterization/Rotation Processing]

Figure 18A:
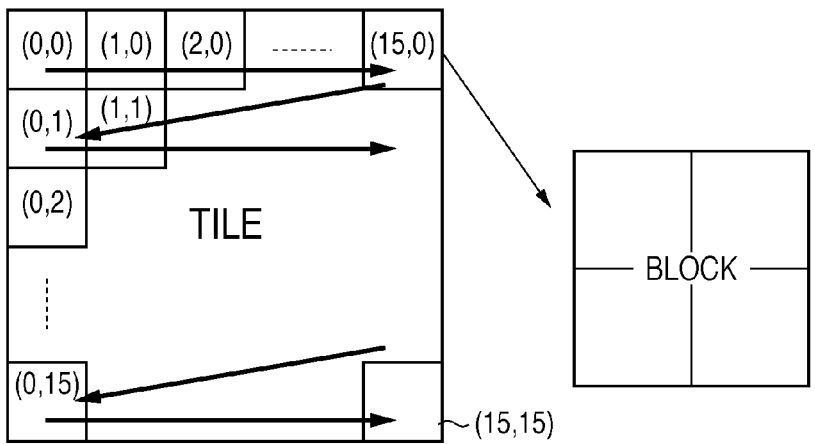
FIGS. 18A, 18B, and 18C are views showing the block read orders according to the embodiment.
Figure 18B:
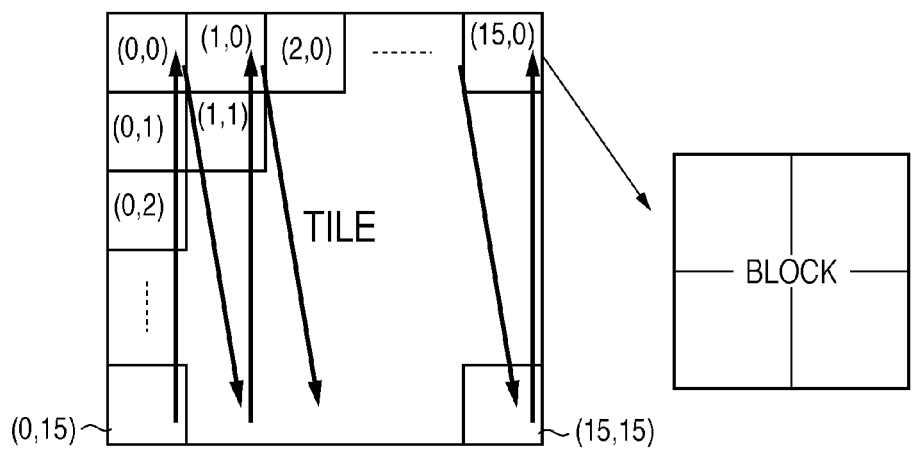

The processing (S311) by the image rasterization/rotation unit 223 will be described in detail next. FIG. 17 is a flowchart showing details of step S311 in FIG. 13 according to the first embodiment. First, the image rasterization/rotation unit 223 reads the rotation angle information (S401). The block read order corresponding to the rotation angle information is decided (S402). Upon assigning two-dimensional block coordinate positions defined by X- and Y-coordinates to the blocks in the tile, the blocks are read and processed in the order of block coordinate positions (0, 0), (1, 0), (2, 0), . . . when the rotation angle is 0°. FIG. 18A shows the block read order when the rotation angle is 0°. On the other hand, the blocks are read and processed in the order of block coordinate positions (0, 15), (0, 14), (0, 13), . . . when the rotation angle is 90°. FIG. 18B shows the block read order when the rotation angle is 90°. The pattern flags are read in the same order as the block read order decided in step S402 (S403). FIG. 19A shows the order of reading the pattern flags of the packets arranged in the memory when the rotation angle is 0°. FIG. 19B shows the order of reading the pattern flags of the packets arranged in the memory when the rotation angle is 90°. The position of the first color in the block is determined based on the rotation angle information and the pattern flag (S404). The first color is at the position of the upper left pixel of the block when the rotation angle is 0°, and is therefore at the position of the upper right pixel of the block when the rotation angle is 90°.

The first color pixel data of the block corresponding to the rotation angle information is read (S405). FIGS. 19A and 19B show the orders of reading the first color pixel data of the packets arranged in the memory when the rotation angle is 0° and 90°, respectively. It is determined based on the pattern flag read in step S403 whether the second, third, and fourth colors exist in the block being processed (S406). If YES is determined in step S406, the positions of the second, third, and fourth colors are determined based on the pattern flag and the position of the first color determined in step S404 (S407). The second, third, and fourth color pixel data of the block are read in accordance with the rotation angle information and the pattern flag (S408). Because none of the second, third, and fourth color pixel data may exist depending on the pattern flag, it is necessary to determine using the pattern flag whether to read the second, third, and fourth color pixel data. FIGS. 19A and 19B show the orders of reading the second, third, and fourth color pixel data of the packets arranged in the memory when the rotation angle is 0° and 90°, respectively.

Figure 20A:
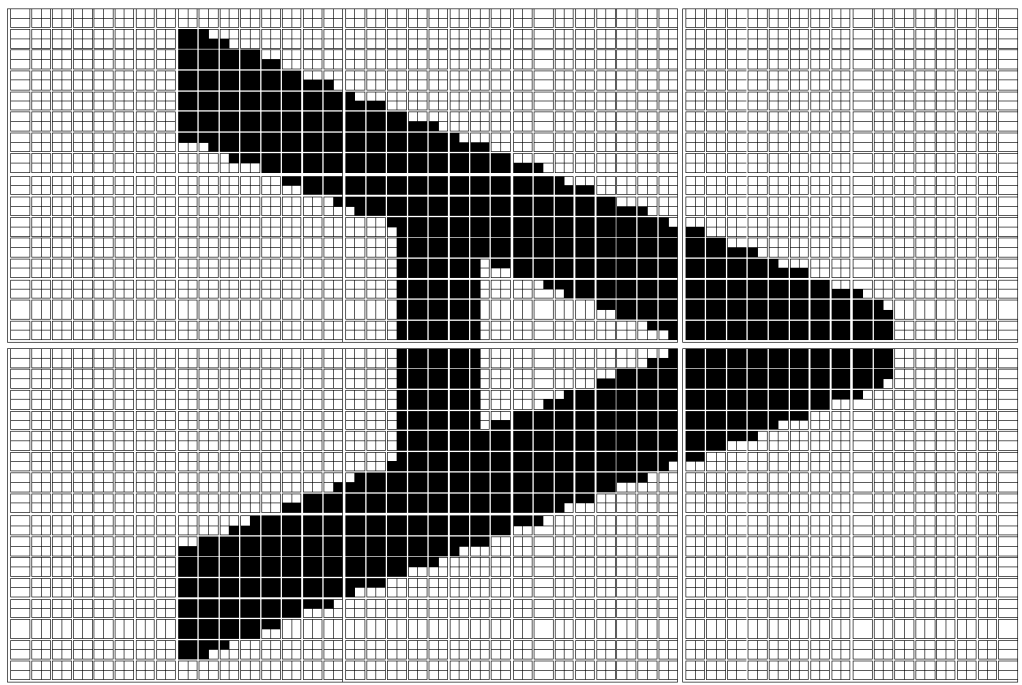
FIGS. 20A and 20B are overall schematic views after completion of rotation according to the embodiment.

The first color pixel data read in step S405 is placed at the position of the first color determined in step S404, and the second, third, and fourth color pixel data read in step S408 are placed at the positions of the second, third, and fourth colors, respectively, determined in step S407 (S409). If NO is determined in step S406, the first color pixel data read in step S405 is placed at the position of the first color determined in step S404 (S409). A detailed example in which the value of the pattern flag is "A" (that is, the three, first to third colors exist) will be given. When the rotation angle is 90°, the first color is at the position of the upper left pixel, and the second and third color data are stored at the positions of the lower right, upper left, and lower left pixels. Hence, the lower right pixel has the second color, and the upper left and lower left pixels have the third color. With the above-mentioned principle, the pixel data are arranged. It is determined whether the processing is complete for all blocks (S410). If YES is determined in step S410, the data is transferred to the print image processing unit 224. The data may be transferred to the print image processing unit 224 every time image rasterization/rotation of each block is completed, as a matter of course. If NO is determined in step S410, the process returns to step S403, in which the processes in steps S403 to S410 are repeated until the processing is completed for all blocks. FIG. 20A shows an overall view of the image having undergone the rotation processing.

With the above-mentioned configuration, the image data can be rotated in a compressed state using a relatively simple compression scheme. This makes it possible to reduce the spaces required for a high-speed arithmetic unit or dedicated hardware and a buffer memory as compared to application of rotation processing to the rasterized image data, thus providing an inexpensive image processing apparatus. A detailed effect will be described by taking a buffer memory as an example. The capacity and processing performance of a buffer memory are proportional to each other, so when, for example, a memory for buffering 32×32 pixels with 8 bits for each of R, G, and B colors is provided, 32×32×8×3=24 Kbytes of the memory can be reduced. Although a block including 2×2 pixels is defined as a minimum unit in this embodiment, the present invention is not limited to this. Also, although compression of 8-bit RGB image data has been explained as an example, data represented by a CMYK color space, grayscale data, or data having pixel values other than 8 bits may be adopted.

Second Embodiment

Figure 21:
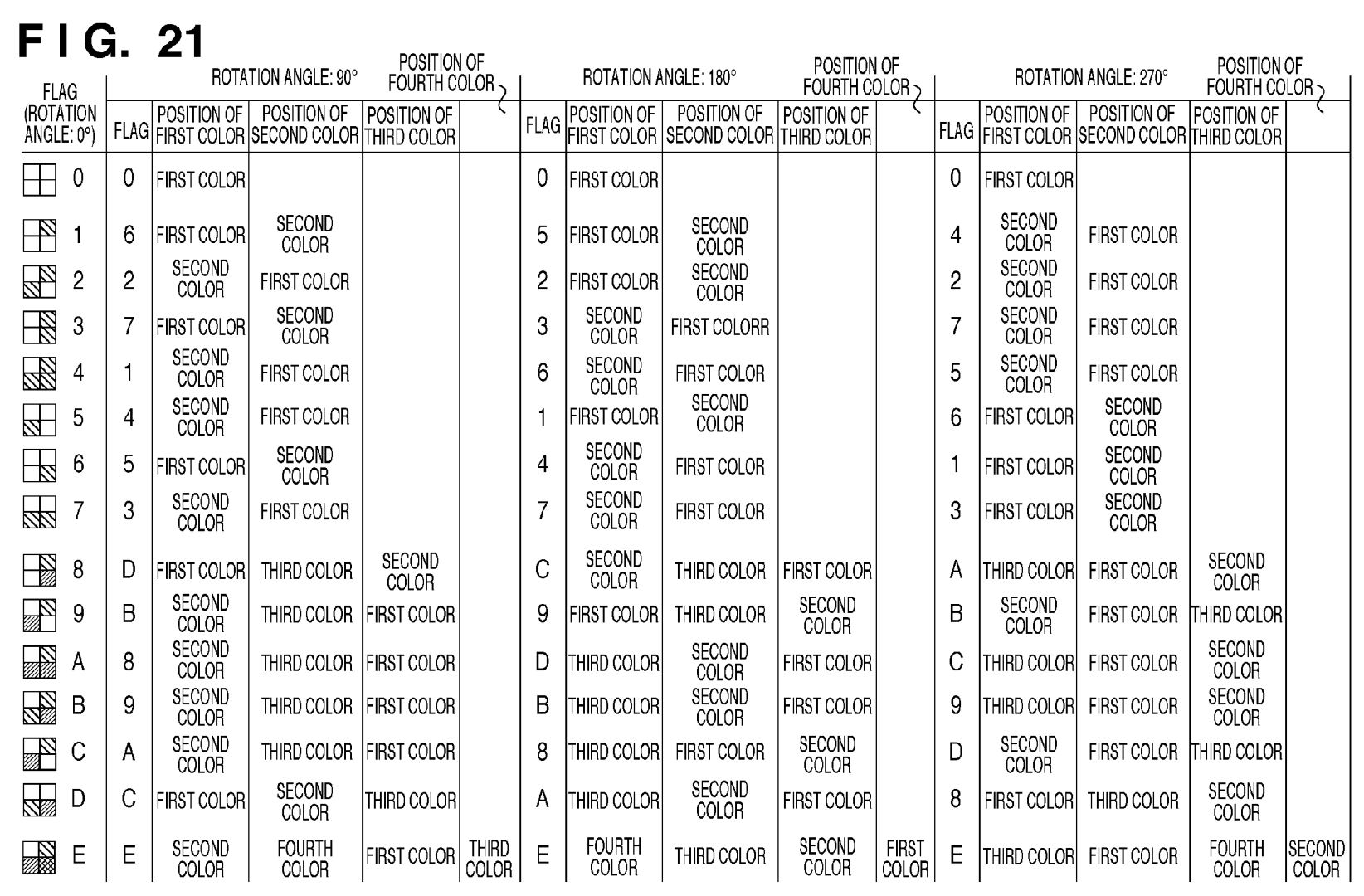

The second embodiment according to the present invention will be described in detail below with reference to the accompanying drawings. Another embodiment of the image rasterization/rotation unit will be described in this embodiment. An image processing apparatus according to the second embodiment of the present invention has the same configuration as that shown in FIG. 1, and a controller 101 has the same configuration as that shown in FIG. 2. However, an image rasterization/rotation unit 223 includes a unit (rotation position holding unit) which stores pieces of information on a pattern flag and the position of the first color before updating, and the pattern flag, the position of the first color, and the positions of the second, third, and fourth colors after updating in accordance with the rotation angle. FIG. 21 shows the positional relationship before and after rotation when the rotation angle is 90°, 180°, and 270°. The information before and after rotation, which is shown in FIG. 21, will be referred to as position information hereinafter. In this embodiment, the position of a color after updating indicates that of one of the first to fourth colors, which is determined upon referring to the pattern flag.

Figure 16C:
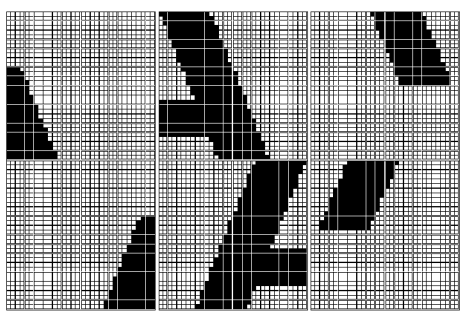

A flowchart showing the operation of the image processing apparatus according to this embodiment is almost the same as that shown in FIG. 13. The procedure, in which image data is read from the scanner, is rotated through 270° clockwise, and is output to the printer, will be described in the second embodiment. Especially the operation of the image rasterization/rotation unit 223 will be described in detail. Assume herein that the image data has a size of 64×96 pixels and the tile in packet generation has a size of 32×32 pixels. The processing details in the flowchart shown in FIG. 13 have differences from those in the first embodiment. The differences include updating of a packet management table by a CPU 201 in step S306, and rewriting of the pieces of rotation angle information of the headers of all packets from 0° to 270° by the CPU 201 in step S307. FIG. 15C shows the packet management table updated upon being rotated through 270° clockwise, and FIG. 16C shows a schematic view of the packet arrangement. FIG. 14C shows the data structure of a packet represented by a tile coordinate position (0, 0) when the updating of the packet management table and the rewriting of the pieces of rotation angle information in the header are completed. A change for rotating the image data through 270° clockwise takes place in the second embodiment.

[Image Rasterization/Rotation Processing]

Figure 18C:
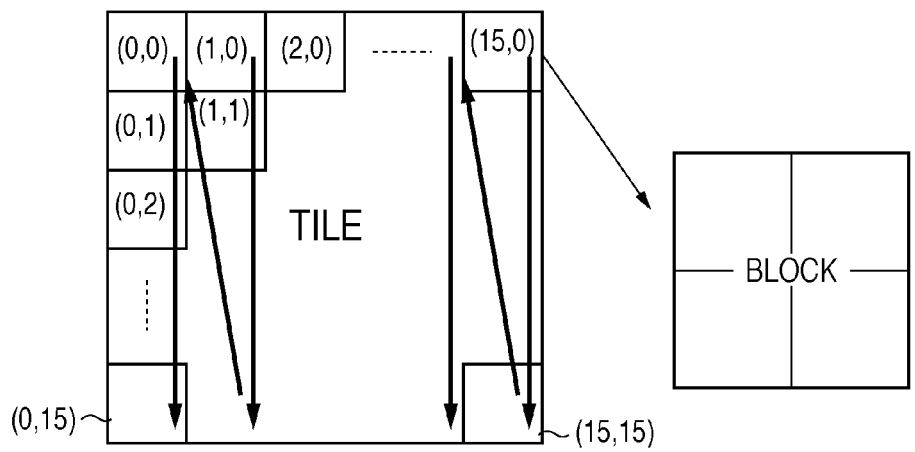
Figure 22:
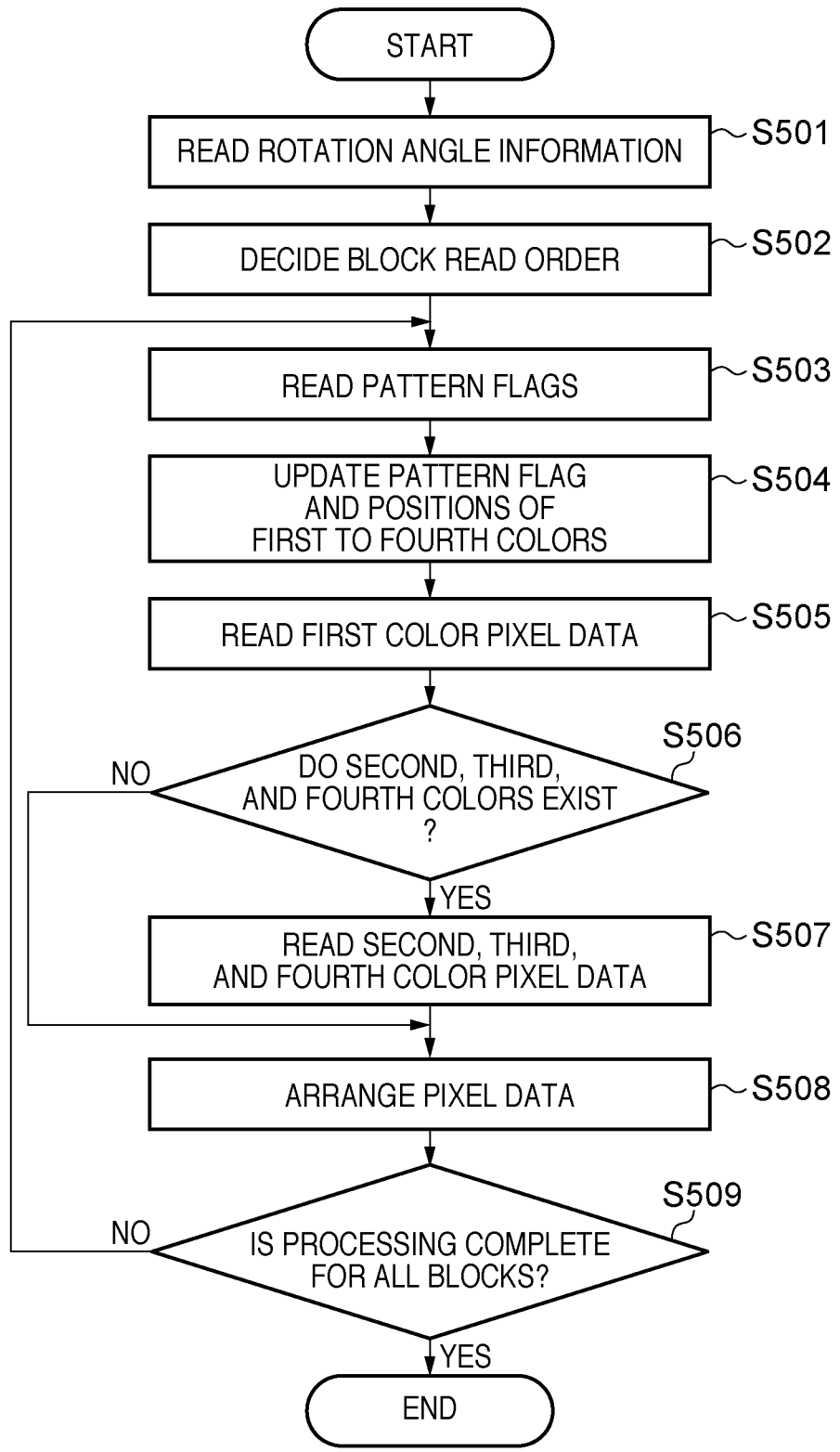
FIG. 22 is a flowchart showing the detailed sequence of the operation of an image rasterization/rotation unit according to the second embodiment.

The processing (S311) by the image rasterization/rotation unit 223 will be described in detail below. FIG. 22 is a flowchart showing details of processing corresponding to step S311 in FIG. 13 according to the second embodiment. First, the image rasterization/rotation unit 223 reads the rotation angle information (S501). The block read order corresponding to the rotation angle information is decided (S502). When the rotation angle is 270°, the blocks are read and processed in the order of block coordinate positions (15, 0), (15, 1), (15, 2), . . . . FIG. 18C shows the block read order when the rotation angle is 270°. The pattern flags are read in the same order as the block read order decided in step S402 (S503). FIG. 19C shows the order of reading the pattern flags of the packets arranged in the memory when the rotation angle is 270°. The pattern flag, the position of the first color, and the positions of the second, third, and fourth colors are updated in accordance with the rotation angle (S504). The first color pixel data of the block corresponding to the rotation angle information is read (S505). It is determined based on the pattern flag updated in step S504 whether the second, third, and fourth colors exist in the block being processed (S506). If YES is determined in step S506, the second, third, and fourth color pixel data are read (S507). Because none of the second, third, and fourth color pixel data may exist depending on the pattern flag, it is necessary to determine using the pattern flag whether to read the second, third, and fourth color pixel data.

Figure 20B:
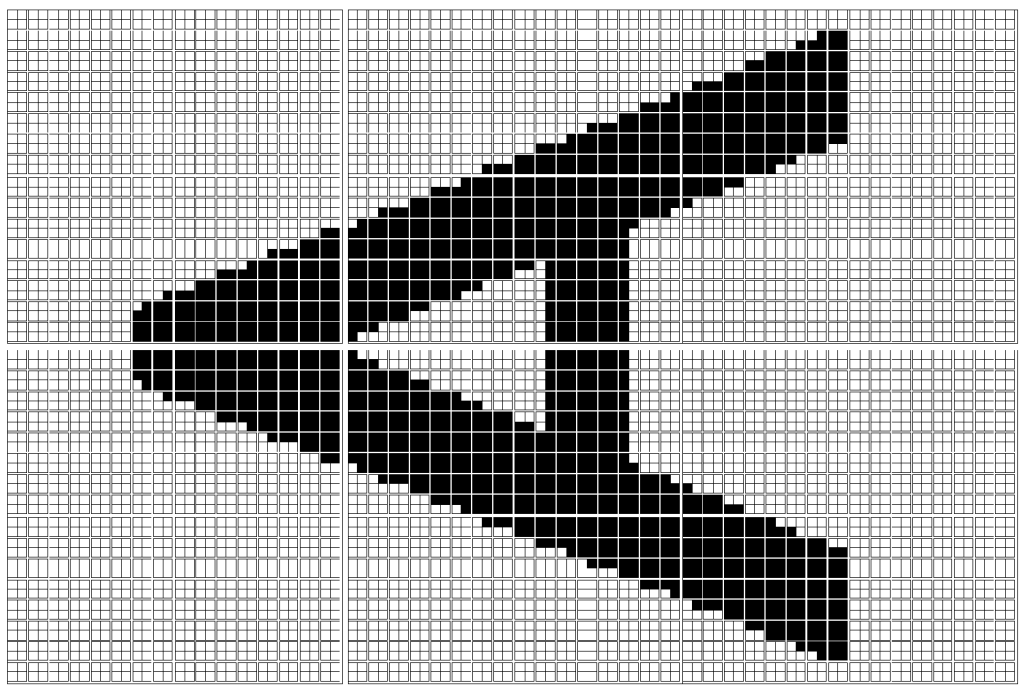

FIG. 19C shows the order of reading the second, third, and fourth color pixel data of the packets arranged in the memory when the rotation angle is 270°. The first color pixel data read in step S505 and the second, third, and fourth color pixel data read in step S507 are placed based on the position of the first color and those of the second, third, and fourth colors, respectively, which are updated in step S504 (S508). If NO is determined in step S506, the first color pixel data read in step S505 is placed at the position of the first color based on the position of the first color and the pattern flag updated in step S504 (S508). A detailed example in which the value of the pattern flag is "B" (that is, the three, first to third colors exist) will be given. As shown in FIG. 21, when the pattern flag is "B" and the rotation angle is 270°, the pattern flag after rotation is 9, and this indicates that the first color is at the position of the lower left pixel. Because the second, third, and fourth color data are stored at the positions of the upper left, lower right, and upper right pixels, the upper left and lower right pixels have the second color, and the upper right pixel has the third color. With the above-mentioned method, the pixel data are arranged using the position information. It is determined whether the processing is completed for all blocks (S509). If YES is determined in step S509, the data is transferred to a print image processing unit 224. The data may be transferred to the print image processing unit 224 every time image rasterization/rotation of each block is completed, as a matter of course. If NO is determined in step S509, the process returns to step S503, in which the processes in steps S503 to S509 are repeated until the processing is completed for all blocks. FIG. 20B shows an overall view of the image having undergone the rotation processing.

Although a block including 2×2 pixels is defined as a minimum unit in this embodiment, the present invention is not limited to this. Also, although compression of 8-bit RGB image data has been explained as an example, data represented by a CMYK color space, grayscale data, or data having pixel values other than 8 bits may be adopted. Moreover, with a change in block size, the numbers of flag patterns and colors used also change, as a matter of course.

With the above-mentioned configuration, image data can be rotated in a compressed state using a relatively simple compression scheme. This makes it possible to reduce the spaces required for a high-speed arithmetic unit or dedicated hardware and a buffer memory as compared to application of rotation processing to the rasterized image data, thus providing an inexpensive image processing apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-058299, filed Mar. 15, 2010, which is hereby incorporated by reference herein in its entirety.

What is claimed is:

1. An image processing apparatus which can rotate input image data in a compressed state, comprising:
    a division unit which divides the input image data into blocks each including a predetermined number of pixels;
    a compression unit which identifies, for each of the divided blocks, information of a color arrangement in each of the divided blocks by comparing color information among pixels included in each of the divided blocks, and outputs the identified information of the color arrangement for each of the divided blocks and the color information included in each of the divided blocks, wherein the color information outputted for each of the divided blocks includes at least first color information corresponding to a pixel at a predetermined position in each of the divided blocks, and wherein the color information outputted for each of the divided blocks further includes the other color information different from the first color information if each of the divided blocks includes the other color information;
    a holding unit which holds, for each tile including a predetermined number of the divided blocks, the outputted information of the color arrangement for the blocks included in each tile, the outputted color information included in each of the blocks included in each tile, and information on a position of the tile in the image data as the image data in the compressed state;
    a storage unit which stores a rotation angle of the image data; and
    a rotation unit which converts, when decoding the information of the color arrangement and the color information held by the holding unit, the information of the color arrangement in accordance with the rotation angle stored in the storage unit to form rotated image data based on the converted color arrangement, the color information held by the holding unit, and the information on a position of the tile.

2. The apparatus according to claim 1, wherein the information of the color arrangement indicates a pattern flag associated with the color arrangement.

3. The apparatus according to claim 1, wherein the holding unit holds the color information in an order corresponding to the color arrangement.

4. The apparatus according to claim 1, wherein the holding unit holds the information of the color arrangement into a first memory area, and holds the first color information into a second memory area, and holds the other color information into a third memory area.

5. The apparatus according to claim 1, wherein information of the tile includes a coordinate position of the tile in the input image data, the number of bits of pixel data, and the number of bits of the color information.

6. The apparatus according to claim 1, wherein the rotation unit changes an order of reading the blocks in accordance with the rotation angle of the image data.

7. A control method for an image processing apparatus which can rotate input image data in a compressed state, comprising:
    a division step of causing a division unit of the image processing apparatus to divide the input image data into blocks each including a predetermined number of pixels;
    a compression step of causing a compression unit of the image processing apparatus to identify, for each of the divided blocks, information of a color arrangement in each of the divided blocks by comparing color information among pixels included in each of the divided blocks, and to output the identified information of the color arrangement for each of the divided blocks and the color information included in each of the divided blocks, wherein the color information outputted for each of the divided blocks includes at least first color information corresponding to a pixel at a predetermined position in each of the divided blocks, and wherein the color information outputted for each of the divided blocks further includes the other color information different from the first color information if each of the divided blocks includes the other color information;
    a holding step of causing a holding unit of the image processing apparatus to hold, for each tile including a predetermined number of the divided blocks, the outputted information of the color arrangement for the blocks included in each tile, the outputted color information included in each of the blocks included in each tile, and information on a position of the tile in the image data as the image data in the compressed state;
    a storage step of causing a storage unit of the image processing apparatus to store a rotation angle of the image data; and
    a rotation step of causing a rotation unit of the image processing apparatus to convert, when decoding the information of the color arrangement and the color information held by the holding unit, the information of the color arrangement in accordance with the rotation angle stored in the storage unit to form rotated image data based on the converted color arrangement, the color information held in the holding step, and the information on a position of the tile.

8. A non-transitory computer-readable medium storing a program for causing a computer to function as:
    a division unit which divides the input image data into blocks each including a predetermined number of pixels;
    a compression unit which identifies, for each of the divided blocks, information of a color arrangement in each of the divided blocks by comparing color information among pixels included in each of the divided blocks, and outputs the identified information of the color arrangement for each of the divided blocks and the color information included in each of the divided blocks, wherein the color information outputted for each of the divided blocks includes at least first color information corresponding to a pixel at a predetermined position in each of the divided blocks, and wherein the color information outputted for each of the divided blocks further includes the other color information different from the first color information if each of the divided blocks includes the other color information;

a holding unit which holds, for each tile including a predetermined number of the divided blocks, the outputted information of the color arrangement for the blocks included in each tile, the outputted color information included in each of the blocks in each tile, and information on a position of the tile in the image data as the image data in the compressed state;

a storage unit which stores a rotation angle of image data and a rotation unit which converts, when decoding the information of the color arrangement and the color information held by the holding unit, the information of the color arrangement in accordance with the rotation angle stored in the storage unit to form rotated image data based on the converted color arrangement, the color information held by the holding unit, and the information on a position of the tile.

* * * * *